United States Patent [19]

Harmon

[11] 4,412,398

[45] Nov. 1, 1983

[54] HUNTING STAND

[76] Inventor: Alvin E. Harmon, R.R. 1, Bagley, Minn. 56621

[21] Appl. No.: 244,660

[22] Filed: Mar. 17, 1981

[51] Int. Cl.³ .......................................... A01M 31/02
[52] U.S. Cl. ...................................................... 43/1
[58] Field of Search ..................... 43/1; 135/3 R, 4 R

[56] References Cited

U.S. PATENT DOCUMENTS

| 1,031,851 | 7/1912 | January | 43/1 |
| 2,690,185 | 9/1954 | Pomykala | 135/3 R |
| 2,854,705 | 10/1958 | McClaran | 43/1 X |
| 3,018,857 | 1/1962 | Parham | 43/1 X |
| 3,509,891 | 5/1970 | De Bolt | 135/4 R |
| 3,513,605 | 5/1970 | Smith | 43/1 X |
| 3,610,249 | 10/1971 | Baker | 135/4 R X |
| 3,693,641 | 9/1972 | Moss | 135/3 R X |
| 3,902,264 | 9/1975 | Radig | 43/1 |

Primary Examiner—John Sipos
Assistant Examiner—Charles L. Willis
Attorney, Agent, or Firm—Robert E. Kleve

[57] ABSTRACT

The invention comprises a hunting stand having a platform, four legs supporting said platform in spaced relation off the ground, one of said legs having rungs to act as a ladder for climbing onto the platform, a circular flexible wall mounted about the outer edge of said platform and adapted to be raised from a position near the level of the platform to a height above the platform, means for supporting said wall in its raised position, a seat on said platform for a hunter to sit on while hunting, said flexible wall when in a raised position acting to conceal the hunter while hunting.

3 Claims, 3 Drawing Figures

HUNTING STAND

This invention relates to hunting stands.

It is an object of the invention to provide a novel hunting stand that can be easily assembled and disassembled.

It is another object of the invention to provide a novel hunting stand that has a platform raised above the ground for the hunter to position himself on while hunting, with an enclosure that can be raised and lowered from about the outer edge of the platform to enclose and conceal the hunter while hunting.

It is another object of the invention to provide a novel hunting stand on an elevated platform that has a platform raised above the ground with a seat rotatably mounted on the platform for the hunter to sit upon while hunting with an enclosure which surrounds the hunter, that can be raised and lowered from the level of the platform to a height above the platform sufficient to enclose and conceal the hunter.

Further objects and advantages of the invention will become apparent as the description proceeds and when taken in conjunction with the accompanying drawing wherein.

Briefly stated, the invention comprises a circular platform having four detachable legs, one of said legs forming a ladder to enable a hunter to climb onto the platform, a seat mounted centrally on the platform for the hunter to sit upon, which may be rotated about 360°, a flexible circular canvas wall having its lower edge secured to the platform and which may be raised to a height above the level of the platform sufficient to at least partially enclose the hunter while seated on the platform, a plurality of removable support rods to support the enclosure in its raised position.

Figure 1:
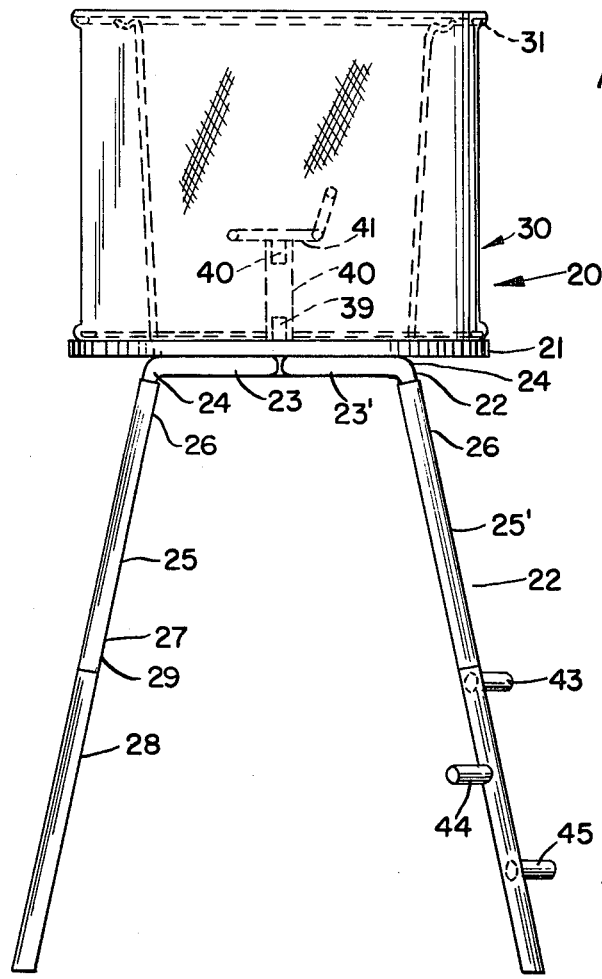
FIG. 1 is a side elevational view of the hunting stand or hunting support device.
Figure 3:
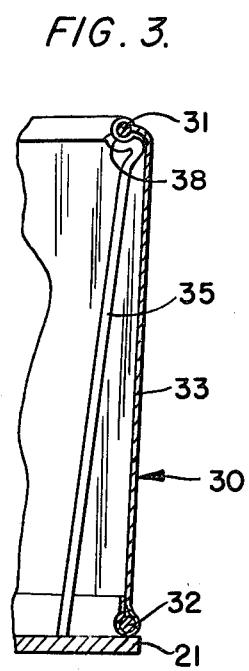
FIG. 3 is a cross-sectional view taken along line 3—3 of FIG. 2, illustrating the construction of the enclosure for the hunter on the platform and the rod structure for supporting the enclosure in the raised position.
Figure 2:
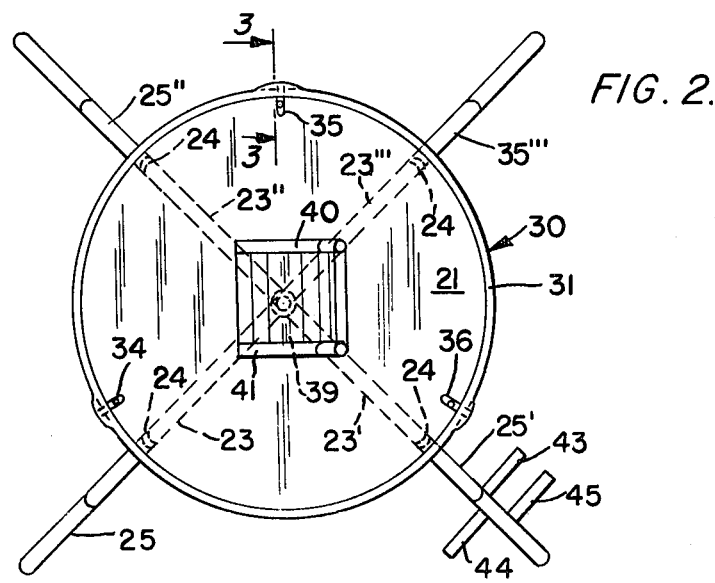
FIG. 2 is a top plan view of the hunting stand or hunting support device.

Referring more particularly to the drawing in FIG. 1, the hunting stand 20 is illustrated as having a circular platform 21, with leg support structure 22 mounted beneath the platform. The leg support structure comprises four pipe sections 23, 23', 23'' which extend radially and horizontally outward from beneath the center of the platform and are fixed to the platform by suitable bolt means. Each pipe section has a downwardly bent outer end 24 and legs 25, 25', 25'', and 25''' are formed of pipe and have reduced upper ends 26 which fit into the bent outer ends 24 of the horizontal pipe section in sliding relation, with suitable pins to lock them in place with the upper ends 26 fitted into the bent ends 24 of the pipe sections. The legs 25-25''' are each made in two sections 27 and 28 with the lower end 29 of the upper section 27 having a reduced end that slidably fits into the upper end of section 28. The sections 27 and 28 may also be made to telescope together with conventional spring lached locking pins to lock them in place in their extended positions.

An enclosure 30 is provided on the platform 21. The enclosure has a circular upper rod 31 and a circular lower rod 32, a circular canvas wall 33 has its upper edge folded about the rod 31 with its folded edge sewn to the wall beneath the rod 31 to secure the upper edge of the wall to the rod. The lower edge of the wall is folded about the rod 32 with its lower edge sewn to the wall above the rod, to secure the lower edge wall to the rod 32.

The lower rod 37 is also bolted to the platform in fixed relation by suitable bolt means.

Three support wire rods 34, 35, and 36 are provided with each having a laterally bent upper portion 37 and a notched portion 38 in the bent upper portion 37, for the upper rod 31 of the canvas wall to rest on with the upper edge of the wall therebetween. The lower ends of the ends of the rods 34, 35, 36 engage against the platform to brace and support the canvas wall in its raised position on the platform, as illustrated in FIG. 1, several feet above the level of the platform.

A short pipe 39 is fixed to the center of the platform 21 and extends vertically upward. A hollow pipe section 40 is fitted over the short pipe 39 in telescoping relation. A seat member 41 has a short pipe section 42 fixed to the bottom thereof and the short pipe section 42 is fitted into the hollow pipe section 40, at the upper end of the pipe 40 in telescoping relation. The seat member 41 is rotatably mounted on the platform by the short pipe section 42 rotating in the upper end of the pipe 40.

One leg 25 has three short horizontal pipes 43, 44, and 45 fixed to the lower section 28 of the leg 25 and they are located in spaced vertical intervals and serve as rungs or steps for a hunter to climb onto the platform.

The legs 25, 25', 25'', and 25''' are of sufficient height so that the platform is approximately six feet above the ground. This height may vary so as to be in accordance and in compliance with hunting regulations.

OPERATION

The hunting stand is used for hunting deer or other game. The hunter will normally take the stand or device into the field to a suitable hunting location and then assemble the stand together. The hunter may separate the legs 25-25''' from the horizontal pipe 23-23''' of the platform by removing the bolt or pin lock and sliding the upper ends of the legs out of the horizontal pipe section. He may also separate the upper and lower pipe sections of the legs removing the bolts and sliding them apart. The canvas wall may be lowered to adjacent the level of the platform by sliding the bent notched portions of the three support rods 34, 35, and 36 out from beneath the upper circular rod 31 of the canvas wall and allowing the canvas wall to fold downward and moving the upper rod 31 down near the level of the platform. The lower ends of the rods 34, 35, and 36 only frictionally engage the platform while supporting the upper rod 31. The seat 41 may be slidably removed from the pipe section 40 by sliding the pipe 42 of the seat up and out of the pipe section 40 and the pipe section 40 may be slid up and off the short pipe 39.

When the hunter has found a suitable location to place the hunting stand for hunting, he will assemble the stand by assembling the sections 27 and 28 of each leg together, with the lower reduced end 29 of section 27 slid into the upper end of section 28 and locked by bolt means. Then the upper ends of each leg 25—25 will be slid into the bent portion 24 of the short horizontal pipe section 23-23''' and locked in place by suitable bolt means. Then the short horizontal pipe section 40 will be slid to the upper end of pipe section 39 of the platform, and the pipe section 41 of the seat will be slid into the upper end of section 40 to mount the seat to the platform.

The hunter may climb up the rungs 43, 44, and 45 of the leg 25 onto the platform, seat himself on the seat 41. He then will raise the canvas wall 33 up to its position illustrated in FIG. 1, and support the wall in this raised position by sliding the notched portion 38 of each rod 34, 35, and 36 beneath the upper rod 31 at equally spaced intervals about the platform and frictionally engage the lower ends of the rods 34, 35, and 36 against the platform with the lower ends of the rods 34, 35, and 36 inclined inward slightly. The canvas wall will be sufficiently taut when the rods 34, 35, and 36 are in place to provide sufficient downward pressure against the rods to hold the rods in place with the upper ends against the rod 31 and lower ends against the platform.

The canvas wall 31 will be of a height when raised to its position shown in FIG. 1 which is at least approximately equal to the height of the hunter while seated on the seat of the platform, so as to conceal, and the hunter may look over the top of the wall to see if there are any game animals within shooting range, and shoot over the top of the wall while seated on the seat of the platform.

The canvas wall may be painted in camouflage colors so that it will blend readily into the background.

Thus, it will be seen that a novel, easily assembled and dissassembled hunting stand has been provided which may be easily used for hunting game animals and the like from a concealed elevated position, and which provides a means for a hunter to remain relatively comfortable for long periods of time while hunting being protected from the wind by the canvas wall and being able to move about somewhat on the platform and still be concealed by the canvas wall or remaining seated on the platform with his presence camouflaged by the wall canvas wall. The rotatable seat enables him to rotate himself while on the seat about a 360 degree circle on the platform when aiming or shooting game.

It will be obvious that various changed and departures may be made to the invention without departing from the spirit thereof and accordingly it is not intended that the invention be limited to that specifically described in the specification or as illustrated in the drawing but only as set forth in the appended claims wherein.

What is claimed is:

1. A hunting platform device comprising an upright sleeve, a platform, said upright sleeve being mounted on said platform and having a vertical axis perpendicular to said platform, said sleeve being made of flexible material, a seat mounted on said platform, said sleeve being movable upward from a position adjacent the platform to a raised position, said sleeve when raised having a height extending from the platform to a height above the seat to surround said seat and form a wall enclosing said seat, to at least partially conceal an operator seated on said seat, said sleeve being open across its top, support means for supporting said sleeve in its raised position, said support means comprising a hoop fixed about the upper open end of said sleeve, removable rods having their upper ends engaging said hoop for supporting said hoop and thereby supporting said sleeve, with their lower ends mounted to said platform, a plurality of legs mounted beneath said platform to support said platform in a raised position above the ground.

2. A hunting platform device comprising an upright vertical flexible sleeve, a platform, said sleeve having a vertical axis and having its lower end mounted to said platform, said sleeve being open across its top, a seat mounted on said platform centrally within said sleeve for a hunter to sit on, said sleeve being movable to be raised and lowered, said sleeve having a vertical height when raised forming a wall about said seat extending from the platform to a height above said seat on said platform, support means for supporting said sleeve in a raised position, said support means comprising a hoop fixed about the upper end of said sleeve and movable brace means between said hoop and said platform to support said sleeve in said raised position, a plurality of legs mounted beneath said platform to support said platform in a position above the ground.

3. A hunting platform device according to claim 2 wherein said legs are detachably mounted to said platform.

* * * * *